United States Patent
Lewis et al.

(10) Patent No.: US 8,827,308 B1
(45) Date of Patent: Sep. 9, 2014

(54) FILTER WITH INTEGRATED BAFFLE

(71) Applicant: Autoliv ASP, Inc., Ogden, UT (US)

(72) Inventors: Robert E. Lewis, West Haven, UT (US); Kirk H. Rasmussen, West Point, UT (US); Matthew A. Cox, Centerville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 35 days.

(21) Appl. No.: 13/839,718

(22) Filed: Mar. 15, 2013

(51) Int. Cl.
*B60R 21/26* (2011.01)
*B60R 21/264* (2006.01)

(52) U.S. Cl.
CPC .................................. *B60R 21/264* (2013.01)
USPC .......................... 280/736; 102/530; 280/741

(58) Field of Classification Search
CPC .. B60R 21/261; B60R 21/262; B60R 21/263; B60R 2021/26011; B60R 2021/2633
USPC .......................... 102/530; 280/736, 740–742
See application file for complete search history.

(56) References Cited

U.S. PATENT DOCUMENTS

| | | | | |
|---|---|---|---|---|
| 4,722,551 | A * | 2/1988 | Adams ............................ | 280/736 |
| 4,950,458 | A | 8/1990 | Cunningham | |
| 5,100,171 | A | 3/1992 | Faigle et al. | |
| 5,219,178 | A * | 6/1993 | Kobari et al. ................. | 280/736 |
| 5,308,370 | A | 5/1994 | Kraft et al. | |
| 5,318,323 | A * | 6/1994 | Pietz ............................ | 280/736 |
| 5,407,120 | A | 4/1995 | Philpot | |
| 5,500,271 | A | 3/1996 | Pasch et al. | |
| 5,501,487 | A * | 3/1996 | Trevillyan et al. ............ | 280/736 |
| 5,516,147 | A | 5/1996 | Clark et al. | |
| 5,582,427 | A * | 12/1996 | Rink et al. ..................... | 280/740 |
| 5,584,506 | A * | 12/1996 | Van Wynsberghe .......... | 280/741 |
| 5,609,360 | A * | 3/1997 | Faigle et al. .................. | 280/740 |
| 5,613,703 | A | 3/1997 | Fischer | |
| 5,700,030 | A * | 12/1997 | Goetz ........................... | 280/736 |
| 5,709,406 | A * | 1/1998 | Buchanan ..................... | 280/737 |
| 5,970,880 | A * | 10/1999 | Perotto ......................... | 102/531 |
| 6,149,193 | A * | 11/2000 | Canterberry et al. ......... | 280/741 |
| 6,189,926 | B1 * | 2/2001 | Smith ........................... | 280/737 |
| 6,253,683 | B1 * | 7/2001 | Fukabori ...................... | 102/530 |
| 6,254,124 | B1 * | 7/2001 | Angermaier .................. | 280/735 |
| 6,314,888 | B1 * | 11/2001 | Muller et al. ................ | 102/530 |
| 6,474,685 | B1 * | 11/2002 | Meixner et al. .............. | 280/741 |

(Continued)

FOREIGN PATENT DOCUMENTS

| | | |
|---|---|---|
| WO | WO 96/30105 | 10/1996 |
| WO | WO 03/057347 | 7/2003 |
| WO | WO 2009/146221 | 12/2009 |

*Primary Examiner* — Paul N Dickson
*Assistant Examiner* — Laura Freedman
(74) *Attorney, Agent, or Firm* — Madson IP, P.C.

(57) ABSTRACT

An airbag assembly may include an airbag and an inflator in fluid communication with the airbag. The inflator may have a first chamber containing a first gas source and a second chamber containing a second gas source. A filter module may be positioned to filter and redirect gas flows from the first and second gas sources. The filter module may be constructed by securing a baffle within an interior cavity of a filter medium having a generally tubular shape, prior to installation of the filter module the inflator. The baffle may be supported directly by the material of the filter module, by a bracket, or by a support structure formed of wire thicker than that of the filter medium. The baffle may maintain isolation between the first and second chambers, or may help gas from the first gas source initiate gas provision from the second gas source.

20 Claims, 5 Drawing Sheets

(56) References Cited

U.S. PATENT DOCUMENTS

| | | | |
|---|---|---|---|
| 6,481,357 B1 * | 11/2002 | Lindner et al. | 102/530 |
| 6,880,853 B2 * | 4/2005 | Watase et al. | 280/741 |
| 7,237,801 B2 | 7/2007 | Quioc et al. | |
| 7,267,365 B2 | 9/2007 | Quioc | |
| 7,343,862 B2 | 3/2008 | McCormick | |
| 7,712,778 B2 * | 5/2010 | Smith et al. | 280/736 |
| 7,762,585 B2 * | 7/2010 | Patterson et al. | 280/740 |
| 7,770,923 B2 * | 8/2010 | Woo | 280/741 |
| 7,806,954 B2 | 10/2010 | Quioc | |
| 7,823,919 B2 | 11/2010 | Jackson et al. | |
| 8,720,946 B2 * | 5/2014 | Prima et al. | 280/741 |
| 2004/0061319 A1 * | 4/2004 | Saso et al. | 280/741 |
| 2007/0138708 A1 * | 6/2007 | Park et al. | 264/603 |
| 2012/0042801 A1 * | 2/2012 | Sasamoto et al. | 102/530 |

\* cited by examiner

FILTER WITH INTEGRATED BAFFLE

TECHNICAL FIELD

The present invention relates to automotive safety. More specifically, the present invention relates to airbag inflators that enhance the cost-effectiveness of airbag systems.

BACKGROUND

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of a charge contained within an inflator. Expanding gases from the charge travel through conduits and fill the airbags, which immediately inflate in front of the driver and passenger to protect them from harmful impact with the interior of the car. Typically, airbags are concealed within the vehicle trim to be invisible during normal vehicle operation.

The inflator is a critical part of the airbag assembly because it supplies the inflation gas needed to inflate the airbag cushion. Typically, inflators are compressed gas, pyrotechnic, or hybrid inflators. "Compressed gas" inflators contain gas under pressure, while "pyrotechnic" inflators contain a pyrotechnic gas generant that ignites to produce the gas. "Hybrid" inflators typically use both compressed gas and a pyrotechnic charge. Some inflators are "dual stage," meaning that they can receive two independent activation signals to enable production of a selectively variable quantity of inflation gas, and others have only a single stage. However, single stage inflators can have multiple timed events, such as the ignition of multiple separate pyrotechnic charges and/or the release of distinct volumes of compressed gas, that are all triggered by a single activation signal.

Inflators of all types are typically made from a wide variety of parts. Each inflator may contain a selection of chambers, diffusers, filters, frangible membranes, initiators, generants, baffles, and containers, attachment hardware, and other components. Each of these parts adds significantly to the cost of the inflator. Hence, the inflator typically makes up a large portion of the cost of an airbag assembly.

Additionally, a series of different manufacturing steps may be needed to manufacture each inflator. The quantity of steps involved not only further increases the cost of potential inflators, it also increases the likelihood of defects in material or workmanship in the finished inflator.

SUMMARY OF THE INVENTION

The various systems and methods of the present invention have been developed in response to the present state of the art, and in particular, in response to the problems and needs in the art that have not yet been fully solved by currently available airbag systems and methods. Thus, it is advantageous to provide airbag systems and methods that provide reliable protection for vehicle occupants in a wide variety of collision situations. Further, it is advantageous to minimize manufacturing and installation costs. The present invention may have other benefits that are not specifically set forth herein.

To achieve the foregoing, and in accordance with the invention as embodied and broadly described herein, an airbag assembly may be provided for protecting a vehicle occupant from injury through use of an airbag. The airbag assembly may include an inflator in fluid communication with the airbag. The inflator may include an exterior wall with an aperture and a first gas source contained within a first chamber defined within the exterior wall. In response to receipt by the inflator of a first activation signal, the first gas source may provide a gas that defines a first gas flow pathway that moves through the inflator and exits the inflator via the aperture. The inflator may also include a filter module positioned in the first gas flow pathway. The filter module may include a filter medium having plurality of holes sized such that, as the gas flows through the filter medium, particulate matter entrained in the gas is trapped in the filter medium, and a baffle secured to the filter medium, the baffle having an impingement surface positioned such that the gas impinges against the impingement surface in a manner that causes redirection of the first gas flow pathway. The baffle may be positioned such that the baffle is in contact with no component of the inflator outside the filter module.

The inflator may further have a second gas source contained within a second chamber defined within the exterior wall. In response to receipt by the inflator of a second activation signal, the second gas source may provide gas that defines a second gas flow pathway that moves through the inflator and exits the inflator via the aperture. The filter module may be positioned in the second gas flow pathway. The impingement surface may be substantially planar and may be oriented substantially perpendicular to the first gas flow pathway where the gas impinges against the impingement surface. Redirection of the first gas flow may prevent the first gas flow from flowing directly into the second chamber through the filter module.

Alternatively, in response to entry of the first gas flow into the second chamber, the second gas source may provide gas that defines a second gas flow pathway that moves through the inflator and exits the inflator via the aperture. The impingement surface may define a generally frusto-conical shape having an axis oriented substantially parallel to the first gas flow pathway where the gas impinges against the impingement surface. Redirection of the first gas flow may direct the first gas flow into the second chamber to facilitate initiation of gas provision by the second gas source.

The filter medium may have a generally tubular shape with an interior surface that defines an interior cavity within which the baffle resides. The baffle may include a circumferential region captured directly by the interior surface. The filter module may alternatively include a bracket captured by the interior surface. the baffle may include a circumferential region that abuts the bracket such that the bracket supports the baffle. As another alternative, the filter medium may be formed of a plurality of wires woven together, and the filter module may include a support structure formed of a plurality of support wires that are significantly thicker than the plurality of wires. The baffle may include a circumferential region that abuts the support structure such that the support structure supports the baffle. As yet another alternative, the interior surface may be tapered such that the filter medium is thicker where it surrounds the baffle than at the ends of the interior surface.

According to one method of manufacturing an inflator, such a method may include providing an exterior wall comprising an aperture, providing a first gas source, positioning the first gas source within a first chamber defined within the exterior wall such that, in response to receipt by the inflator of a first activation signal, the first gas source provides a gas that defines a first gas flow pathway that moves through the inflator and exits the inflator via the aperture, providing a filter module comprising a filter medium having plurality of holes, and a baffle secured to the filter medium, the baffle comprising an impingement surface, and positioning the filter module in the first gas flow pathway such that, as the gas flows through the filter medium, particulate matter entrained in the gas is trapped in the filter medium and the gas impinges against the impingement surface in a manner that causes redirection of the first gas flow pathway. Providing the filter module may include securing the baffle to the filter medium prior to positioning of the filter module in the first gas flow pathway.

The method may further include providing a second gas source, and positioning the second gas source within a second chamber defined within the exterior wall such that, in response to receipt by the inflator of a second activation signal, the second gas source provides gas that defines a second gas flow pathway that moves through the inflator and exits the inflator via the aperture. The impingement surface may be substantially planar. Positioning the filter module in the first gas flow pathway may include positioning the filter module in the second gas flow pathway and orienting the impingement surface substantially perpendicular to the first gas flow pathway where the gas impinges against the impingement surface. Redirection of the first gas flow may prevent the first gas flow from flowing directly into the second chamber through the filter module.

Alternatively, the method may include providing a second gas source, and positioning the second gas source within a second chamber defined within the exterior wall such that, in response to entry of the first gas flow into the second chamber, the second gas source provides gas that defines a second gas flow pathway that moves through the inflator and exits the inflator via the aperture. The impingement surface may define a generally frusto-conical shape. Positioning the filter module in the first gas flow pathway may include orienting an axis of the frusto-conical shape substantially parallel to the first gas flow pathway where the gas impinges against the impingement surface. Redirection of the first gas flow may direct the first gas flow into the second chamber to facilitate initiation of gas provision by the second gas source.

The filter medium may have a generally tubular shape with an interior surface that defines an interior cavity. The baffle may have a circumferential region. Securing the baffle to the filter medium may include directly capturing the circumferential region with the interior surface. Alternatively, the filter module may further include a bracket. Securing the baffle to the filter medium may include capturing the bracket with the interior surface, and positioning the baffle such that the circumferential region abuts the bracket such that the bracket supports the baffle. As another alternative, the filter medium may be formed of a plurality of wires woven together and the filter module may further have a support structure formed of a plurality of support wires that are significantly thicker than the plurality of wires. Securing the baffle to the filter medium may include capturing the support structure with the interior surface, and positioning the baffle such that the circumferential region abuts the support structure such that the support structure supports the baffle.

According to another embodiment, an airbag assembly for protecting a vehicle occupant from injury may include an airbag, an inflator in fluid communication with the airbag. The inflator may include an exterior wall with an aperture, a first gas source contained within a first chamber defined within the exterior wall, wherein, in response to receipt by the inflator of a first activation signal, the first gas source provides a gas that defines a first gas flow pathway that moves through the inflator and exits the inflator via the aperture, a second gas source contained within a second chamber defined within the exterior wall, and a filter module positioned in the first gas flow pathway. The filter module may include a filter medium having plurality of holes sized such that, as the gas flows through the filter medium, particulate matter entrained in the gas is trapped in the filter medium, and a baffle secured to the filter medium. The baffle may have an impingement surface positioned such that the gas impinges against the impingement surface in a manner that causes redirection of the first gas flow pathway. The filter medium may include a generally tubular shape comprising an interior surface that defines an interior cavity within which the baffle entirely resides.

In response to receipt by the inflator of a second activation signal, the second gas source may provide a gas that defines a second gas flow pathway that moves through the inflator and exits the inflator via the aperture. The filter module may be positioned in the second gas flow pathway. The impingement surface may be substantially planar and may be oriented substantially perpendicular to the first gas flow pathway where the gas impinges against the impingement surface. Redirection of the first gas flow may prevent the first gas flow from flowing directly into the second chamber through the filter module.

Alternatively, in response to entry of the first gas flow into the second chamber, the second gas source may provide gas that defines a second gas flow pathway that moves through the inflator and exits the inflator via the aperture. The impingement surface may define a generally frusto-conical shape having an axis oriented substantially parallel to the first gas flow pathway where the gas impinges against the impingement surface. Redirection of the first gas flow may direct the first gas flow into the second chamber to facilitate initiation of gas provision by the second gas source.

These and other features and advantages of the present invention will become more fully apparent from the following description and appended claims, or may be learned by the practice of the invention as set forth hereinafter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Exemplary embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid that exits one feature is able to pass into or otherwise contact the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to any airbag type.

Figure 1:
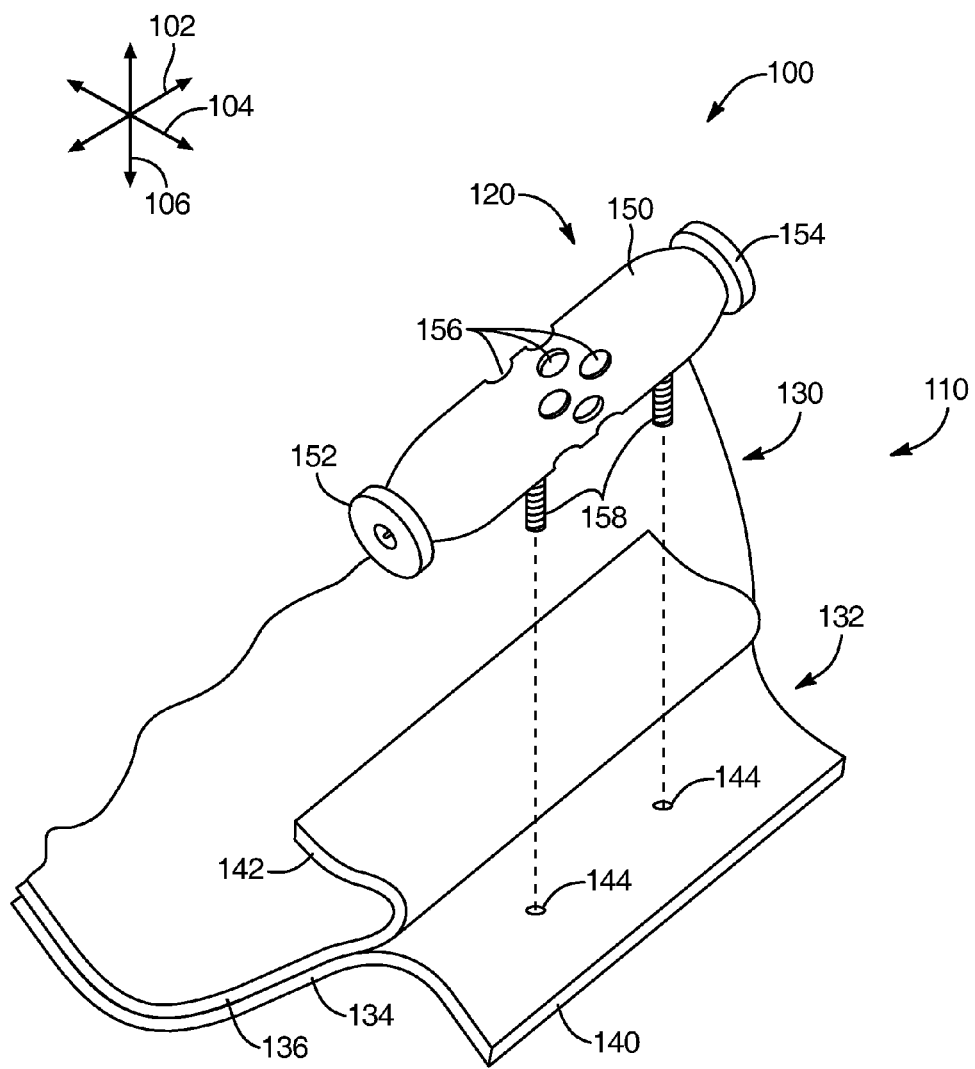
FIG. 1 is a perspective view of an airbag assembly according to one embodiment of the invention.

Referring to FIG. 1, a perspective view illustrates an airbag assembly 100 that may be used to protect the occupants of a vehicle during a collision. The airbag assembly 100 may be of any known type, including but not limited to driver's side airbags, passenger's side airbags, side airbags, inflatable curtain airbags, and knee airbags. The airbag assembly 100 may have a longitudinal direction 102, a lateral direction 104, and a transverse direction 106, all of which are orthogonal to each other.

The airbag assembly 100 may include an airbag 110 and an inflator 120. The airbag 110 may have a cushion 130 that inflates to receive and cushion impact from one or more vehicle occupants, and a mounting portion 132 securable to the vehicle. The airbag 110 may generally be formed from a first layer 134 and a second layer 136, both of which may be formed of a flexible material such as a woven fabric, a thin polymer sheet, or the like. The first layer 134 and the second layer 136 may be attached together via one-piece weaving, ultrasonic welding, RF welding, stitching, adhesive bonding, or a variety of other methods known in the art.

The first layer 134 and the second layer 136 may cooperate to define a first flap 140 and a second flap 142, which may be secured together to partially or fully enclose the inflator 120. A pair of holes 144 may be formed in the first flap 140 to facilitate attachment of the inflator 120 and the mounting portion 132 to the vehicle.

The inflator 120 may have a generally cylindrical shape oriented generally along the longitudinal direction 102. The inflator 120 may have a length along the longitudinal direction 102 that is much greater than its width along the lateral direction 104 and the transverse direction 106. The inflator 120 may have an exterior wall 150, a first end cap 152, and a second end cap 154. The exterior wall 150 may have a plurality of apertures 156 that release inflation gas into the interior of the cushion 130 in response to receipt of an activation signal indicative of a collision, impending collision, or other sudden acceleration or deceleration event.

The inflator 120 may also have mounting features that facilitate attachment of the inflator 120 and the mounting portion 132 to the vehicle. The mounting features may take the form of a pair of fasteners 158 that are secured to the exterior wall 150 and are spaced apart so as to be insertable through the holes 144 of the first flap 140. After insertion through the holes 144, the fasteners 158 may be secured to a mounting bracket or other interface on the vehicle.

The configuration illustrated in FIG. 1 may be particularly suited to a side impact airbag that deploys from the seat or a part of the vehicle proximate the outboard surface of the seat. However, in use with the other airbag types set forth above, an inflator and airbag may be configured much differently from those shown in FIG. 1. For example, the inflator 120 may not be elongated, but may have a more disc-like shape in which the width is greater than the length. Apertures need not be located in the middle of an inflator as illustrated; rather apertures may be positioned at one or both ends of the inflator and/or at any location between them. Those of skill in the art will recognize that the inventive principles set forth herein may be used with a wide variety of inflator types.

Figure 2:
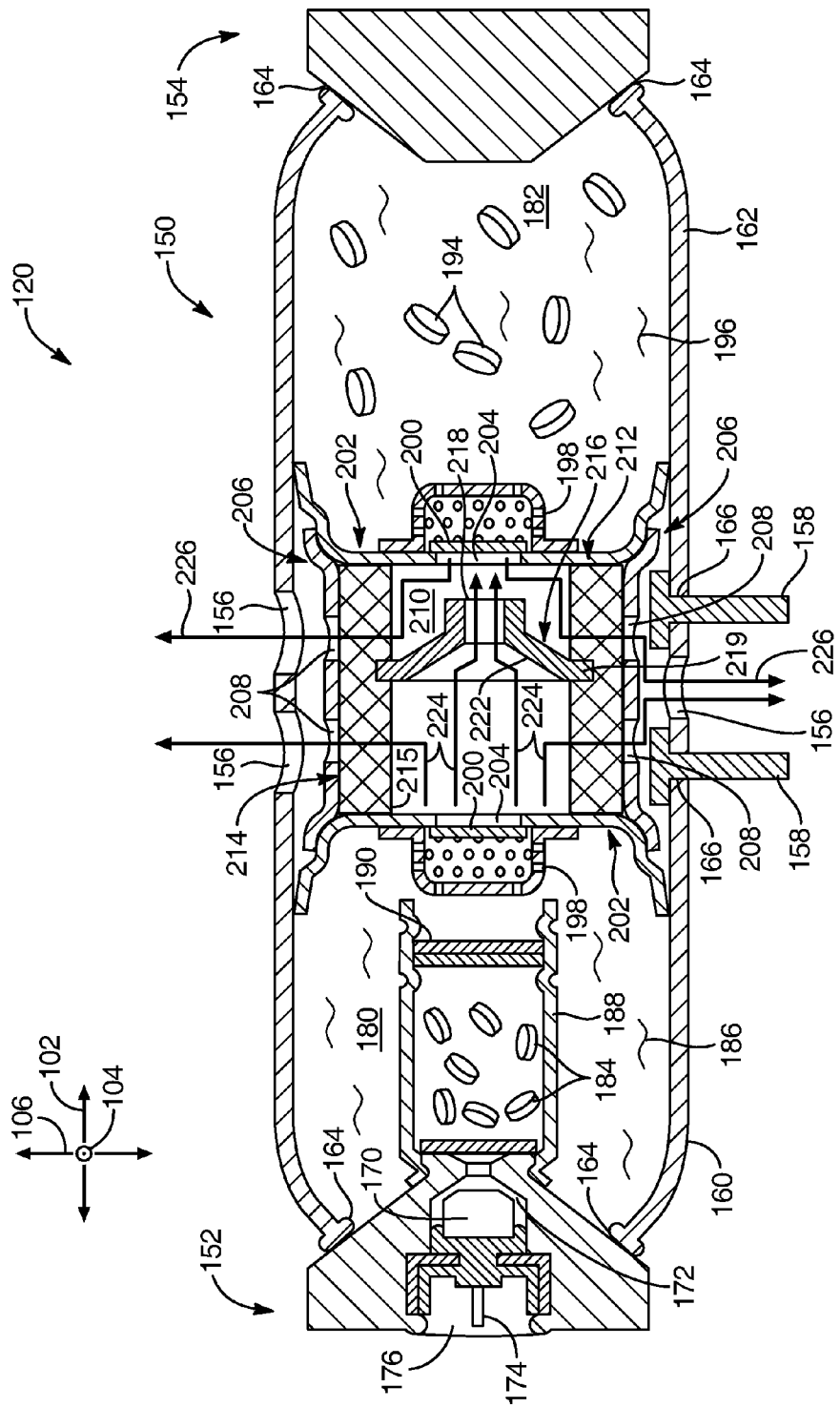
FIG. 2 is a side elevation, section view of the inflator of the airbag assembly of FIG. 1.

Referring to FIG. 2, a side elevation, section view illustrates the inflator 120 of the airbag assembly 100 of FIG. 1. The exterior wall 150 may have a first end 160 and a second end 162 displaced from the first end 160 along the longitudinal direction 102. As shown, the exterior wall 150 may be formed as a single piece, but in alternative embodiments, an exterior wall may be formed of multiple pieces joined together. The exterior wall 150 may be secured to the first end cap 152 and the second end cap 154 through a variety of ways including welding, brazing, chemical or adhesive bonding, fastening, or the like.

As illustrated, the exterior wall 150 may be secured to the first end cap 152 and the second end cap 154 via welds 164, which may be formed via a variety of techniques. Such techniques include laser welding, in which a laser is applied to the junctions between the exterior wall 150 and the first end cap 152 and/or the second end cap 154 to directly heat the material. Such techniques also include inertial welding, in which relative rotation and pressure between the exterior wall 150 and the first end cap 152 and/or the second end cap 154 causes friction that generates the heat needed to form the welds 164.

The fasteners 158 may pass through fastener holes 166 in the exterior wall 150. The fasteners 158 may be bonded, fastened, or otherwise secured to the exterior wall 150. Alternatively, mounting hardware need not be incorporated into the inflator 120, but may instead be provided separately.

The first end cap 152 may have an initiator 170 that ignites in response to receipt of an activation signal from the vehicle, which may, in turn, be generated by a signal-generating element (not shown) such as a control system, sensor assembly, or other apparatus within the vehicle. The initiator 170 may be located within a cavity 172 defined within the interior of the first end cap 152 as shown, or may alternatively protrude into the interior of the inflator 120. The initiator 170 may be electrically connected to the activation signal-generating element within the vehicle via a pin 174 that resides within a socket 176 defined within the exposed end of the first end cap 152 so as to receive a connector such as a plug (not shown) connected to the signal-generating element.

The inflator 120 may be a single stage inflator, and may thus fully activate in response to receipt of only a single activation signal. Thus, the second end cap 154 need not receive or convey an activation signal. The second end cap 154 may be a unitary block of material as shown.

A first chamber 180 and a second chamber 182 may be defined within the exterior wall 150. The first chamber 180 may contain a first gas source and the second chamber 182 may contain a second gas source. The present invention encompasses all different gas sources; accordingly, gas sources including pyrotechnic generants, compressed, stored gas, or any other known gas sources may be used.

The inflator 120 may take the form of a hybrid inflator that utilizes both pyrotechnic generants and compressed gases. Thus, the first chamber 180 may contain a generant 184 and a gas 186. Generally, a "generant" is a substance that produces gas through some type of reaction including combustion or other chemical reactions. A generant may be a solid, a liquid, or any combination thereof. As shown in FIG. 2, the generant 184 may take the form of pellets that predictably combust to produce inflation gas.

The gas 186 may be a compressed gas that resides under pressure within the first chamber 180. The gas 186 may be kept separate from the generant 184 by a circumferential wall 188 and an end wall 190 that cooperate to define a generant chamber that contains the generant 184. The circumferential wall 188 may be crimped on either side of the end wall 190 to keep the end wall 190 in place without the need for fasteners or adhesives. The end wall 190 may be designed to rupture as the generant 184 commences producing gas.

The second chamber 182 may also contain a generant 194 and a gas 196, which may be similar to the generant 184 and the gas 186 within the first chamber 180. The generant 194 and the gas 196 may be intermingled as shown, or alternatively, the generant 184 may be retained within a separate container within the second chamber 182. Generally, the generant 194 and the gas 196 within the second chamber 182 may be ignited and/or released by gas flowing from the first chamber 180. Thus, the generant 194 and the gas 196 may serve to augment the gas produced by the generant 184 and the gas 186, and may provide inflation gases at a time that provides the proper inflation profile of the airbag 110 over time.

Each of the first chamber 180 and the second chamber 182 may contain an internal barrier 198 that helps to restrict the ejection of fast-moving particulates. Such particulates may include combusting generant and/or parts of the circumferential wall 188 and the end wall 190 after rupture thereof. The internal barriers 198 may help keep such particulates and debris within the first chamber 180 and the second chamber 182, thereby providing an initial filtration stage that helps to keep such matter within the inflator 120 and prevents it from interfering with the operation of downstream components. The first chamber 180 and the second chamber 182 may each be sealed via a frangible membrane such as a burst disc 200. Each of the burst discs 200 may be designed to rupture as the pressure within the first chamber 180 or the second chamber 182 exceeds a threshold level.

The exterior wall 150 may define the circumference of each of the first chamber 180 and the second chamber 182. The first chamber 180 and the second chamber 182 may be further defined via an end wall 202 that is oriented generally perpendicular to the longitudinal direction 102. Each of the end walls 202 may be secured to the interior surface of the exterior wall 150 via welding, brazing, chemical or adhesive bonding, or any other suitable attachment method. Each of the end walls 202 may have a opening 204 covered by the burst disc 200 that corresponds to it.

The end walls 202 may be connected together via a circumferential wall 206 with a generally cylindrical shape. The circumferential wall 206 may be secured to each of the end walls 202 via welding, brazing, chemical or adhesive bonding, or any other suitable attachment method. The circumferential walls 206 and the end walls 202 may thus cooperate to define a filter chamber 210 that is generally in the center of the airbag 110. The circumferential wall 206 may have openings 208 positioned to permit gas to flow out of the filter chamber 210 and out of the inflator 120 through the apertures 156.

A filter module 212 may be positioned to further filter the gases provided by the various gas sources within the inflator 120, including the generant 184, the gas 186, the generant 194, and the gas 196. The filter module 212 may have a filter medium 214 and a baffle 216. The filter medium 214 may have a generally tubular shape with an interior surface 215 that defines a generally cylindrical internal cavity within the interior of the filter medium 214. The baffle 216 may be positioned to reside entirely within the interior cavity of the filter medium 214, as shown. The filter medium 214 may be formed of woven, knit, expanded, or compressed metal such as wire. The filter medium 214 may be formed of a relatively thin wire that leaves narrow intervening spaces such that the filter medium 214 is effective in trapping the particulates and other impurities that may be entrained in the gas flowing through the filter chamber 210.

The baffle 216 may have a generally frusto-conical shape with an axis parallel to the longitudinal direction 102 and to the axis of the inflator 120. The baffle 216 may have an opening 218 toward the second chamber 182, and a circumferential region 219 captured by the interior surface 215 of the filter medium 214. The baffle 216 may further have an impingement surface 222 against which gas from the first chamber 180 impinges during deployment of the inflator 120.

In the inflator 120 of FIG. 2, the baffle 216 may be in contact with only the filter medium 214. The filter medium 214 and the baffle 216 may be assembled together prior to installation of the resulting filter module 212 in the inflator 120. The integration of the filter medium 214 and the baffle 216 may help to conserve metal that may otherwise be needed to form a baffle that can be secured to the end wall 202, the circumferential wall 206, and/or any other part of the inflator 120. Integration of the filter medium 214 and the baffle 216 may also facilitate assembly of the inflator 120 by omitting the attachment of the baffle 216 to the inflator interior, which may otherwise be required for the use of a baffle that is discrete from the filter medium (not shown).

In operation, an activation signal may be produced by the associated signal-generating element in response to detection of a collision, impending collision, or other event that requires deployment of the airbag assembly 100. The activation signal may be conveyed to the socket 176 and to the initiator 170 through the pin 174. The initiator 170 may then ignite to cause ignition of the generant 184 within the first chamber 180. The generant 184 may produce gas that ruptures the circumferential wall 188 and/or the end wall 190. The expanding gas may rupture the burst disc 200 and flow out of the opening 204 in the end wall 202 to enter the filter chamber 210.

The gas provided by the first chamber 180 may define first gas flow pathways 224 that flows from the first chamber 180 to the apertures 156 that permit the gas to flow out of the inflator 120. Some of the first gas flow pathways 224 may enter the filter medium 214 directly, or may impinge against the baffle 216 in a manner that they are redirected radially to pass through the filter medium 214, through the openings 208 of the circumferential wall 206, and through the apertures 156 to exit the inflator 120.

Some of the first gas flow pathways 224 may also impinge against the impingement surface 222 of the baffle 216. The impingement surface 222 may, in return, redirect the first gas flow pathways 224 such that some of the first gas flow pathways 224 are concentrated to flow through the opening 218 of the baffle 216. The gas in these first gas flow pathways 224 may thus form a jet exiting the opening 218 to impinge against the burst disc 200, thereby rupturing the burst disc 200 and opening the second chamber 182. These gases may enter the second chamber 182 and may be of a sufficient temperature and pressure to ignite the generant 194 in the second chamber 182.

The gas produced by the generant 194 may combine with the gas 196 to provide second gas flow pathways 226 exiting the second chamber 182. Some of the second gas flow pathways 226 may also impinge against the baffle 216, and may be redirected generally radially so that the second gas flow pathways 226 flow through the filter medium 214 to pass through the filter medium 214, through the openings 208 of the circumferential wall 206, and through the apertures 156 to exit the inflator 120.

During passage of the gases in the first gas flow pathways 224 and the second gas flow pathways 226 through the filter medium 214, particulates, debris, and any other impurities within the gas may be trapped, and the gas may be cooled. Thus, the gas may exit the inflator 120 a the desired temperature and level of purity to effectively inflate the airbag 110 without damaging it.

The filter module 212 may be produced in a variety of ways. According to one method, the filter medium 214 may be formed separately from the baffle 216 via methods known in the art, and the baffle 216 may be stamped, forged, rolled, or otherwise formed by any of a variety of manufacturing methods. The baffle 216 may be inserted into the interior cavity defined within the filter medium 214 after formation of the filter medium 214. This may be accomplished, for example, by deforming the interior surface 215 of the filter medium 214 to enable the interior surface 215 to receive the baffle 216, and then returning the filter medium 214 back to its proper configuration.

Alternatively, a temperature differential may be applied between the filter medium 214 and the baffle 216 to cause the filter medium 214 to expand (for example, by heating the filter medium 214) and/or cause the baffle 216 to contract (for example, by cooling the baffle 216). Once the baffle 216 is in place, the filter medium 214 and baffle 216 may return to similar temperatures so that the circumferential region 219 of the baffle 216 is captured by the interior surface 215 in the manner illustrated.

In the alternative to the foregoing, the filter medium 214 may not be fully formed prior to insertion of the baffle 216 into the interior cavity. For example, the filter medium 214 may be wound and/or woven form one longitudinal end to the other. The baffle 216 may be inserted into the partially-formed filter medium 214 so that the circumferential region 219 is captured by the interior surface 215 during the remainder of the process of fabricating the filter medium 214.

Alternatively, the interior surface 215 of the filter medium 214 may first be formed around the baffle 216 to capture the baffle 216 in the initial stages of formation of the filter medium 214. The remainder of the filter medium 214 may then be formed outwardly of the interior surface 215 with the baffle 216 in place.

As yet another alternative, if the filter medium 214 is formed of compacted wire, the filter medium 214 may simply be compacted into the tubular shape around the baffle 216. For example, a mold (not shown) may receive the baffle 216 prior to compaction of the material of the filter medium 214 into the mold. The material of the filter medium 214 may then be compacted into the mold around the baffle 216 so that, when the compaction process is complete, the baffle 216 is in place within the interior surface 215.

As mentioned, the inflator 120 is a dual-stage, hybrid inflator. The principles of the present invention may be applied to a wide variety of inflator types. One alternative inflator type will be shown and described in connection with FIG. 3.

Figure 3:
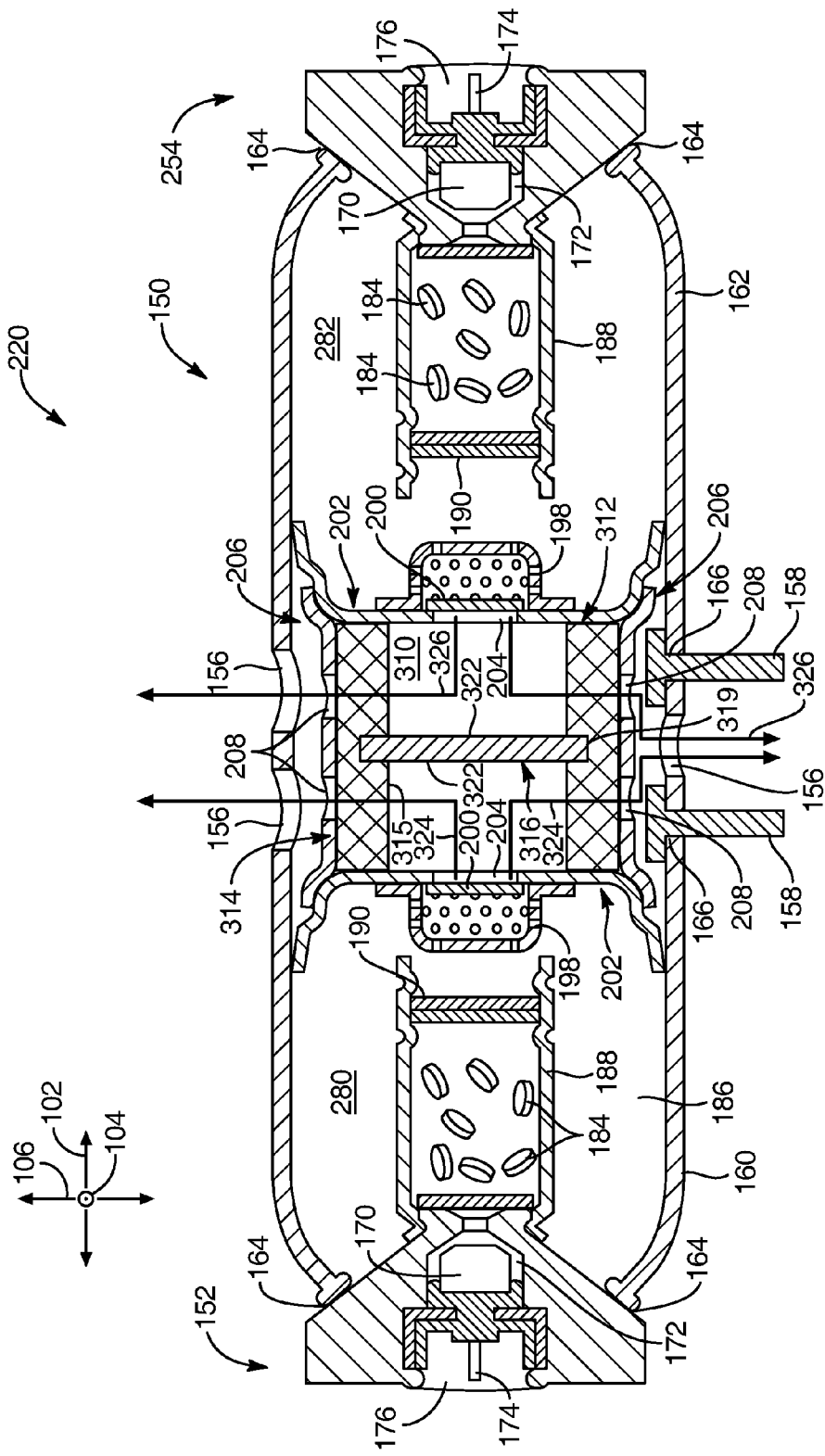
FIG. 3 is a side elevation, section view of an inflator according to one alternative embodiment of the invention.

Referring to FIG. 3, a side elevation, section view illustrates an inflator 220 according to one alternative embodiment of the invention. Some elements of the inflator 220 are the same or similar to those of the inflator 120, and are thus indicated by the same reference numbers used before. The inflator 220 differs from the inflator 120 in that the inflator 220 is a dual-stage inflator. Thus, the inflator 220 may have a second end cap 254 that is configured in a manner similar to that of the first end cap 152 so that a second activation signal can be received through the second end cap 254 to ignite an initiator 170 that is separate from and independent of the initiator 170 in the first end cap 152. The initiator 170 may be electrically connected to the signal-generating element via the pin 174 and socket 176 of the second end cap 254, which may receive a corresponding electrical plug (not shown) or the like.

The inflator 220 may have a first chamber 280 similar to the first chamber 180, except that the first chamber 280 may not contain the gas 186. Rather, the inflator 220 may be a purely pyrotechnic inflator. The inflator 220 may also have a second chamber 282 that is substantially the same as the first chamber 280. Thus, the second chamber 282 may also contain a generant 184 retained within a chamber defined by a circumferential wall 188 and a end wall 190 like those of the first chamber 280. Like the first chamber 280, the second chamber 282 may not contain a compressed gas, and may provide gas solely via the generant 184. As in the first chamber 280, the generant 184 in the second chamber 282 may be ignited to produce gas in response to ignition of the initiator 170 in the second end cap 254.

In the inflator 220, the end walls 202 and the circumferential wall 206 may cooperate to define a filter chamber 310. A filter module 312 may be positioned within the filter chamber 310. The filter module 312 may include a filter medium 314 and a baffle 316. The filter medium 314 may have an interior surface 315 defining an interior cavity within the filter medium 314, within which the baffle 316 resides in its entirety.

The baffle 316 may have a generally discoid shape with a circumferential region 319 captured by the interior surface 315 of the filter medium 314. The baffle 316 may also have two impingement surfaces 322 that face outward toward the first chamber 280 and the second chamber 282. The baffle 316 may generally serve to keep gases from each of the first chamber 280 and the second chamber 282 from interfering with the operation of the other chamber so that the first chamber 280 and the second chamber 282 can be operated independently. Thus, depending, for example, on the severity of the impact, only one or both of the first chamber 280 and the second chamber 282 may deploy.

In operation, the initiator 170 of the first end cap 152 may receive a first activation signal from the signal-generating element, and in response, may ignite to cause ignition of the generant 184. The generant 184 may produce gas at a pressure that ruptures the circumferential wall 188 and/or the end wall 190, and then passes through the internal barrier 198 within the first chamber 280 to rupture the burst disc 200 that seals the first chamber 280. The gases from the first chamber 280 may define first gas flow pathways 324 that flow into the filter chamber 310 an impinge against the impingement surface 322 that faces the first chamber 280. The impingement surface 322 may redirect the gases of the first gas flow pathways 324 radially so that these gases pass through the filter medium 314, through the openings 208 of the circumferential wall 206, and through the apertures 156 to exit the inflator 220.

The baffle 316 may prevent the gases of the first gas flow pathways 324 from flowing with significant velocity into the opening 204 of the second chamber 282. Thus, the baffle 316 may prevent these gases from interfering with the second chamber 282 by, for example, causing undesired deployment of the second chamber 282 or resisting the rupture of the burst disc 200 of the second chamber 282 by gases emerging from the second chamber 282.

Assuming the second chamber 282 is also deployed through the use of a second activation signal to the initiator 170 of the second end cap 254, the generant 184 within the second chamber 282 may also ignite to produce gases. These expanding gases may rupture the circumferential wall 188 and/or the end wall 190 of the second chamber 282, and then rupture the burst disc 200 within the second chamber 282 to define second gas flow pathways 326 exiting the second chamber 282. Like the first gas flow pathways 324, the gases of the second gas flow pathways 326 may impinge against the impingement surface 322 facing the second chamber 282. The gases of the second gas flow pathways 326 may be redirected by the impingement surface 322 in radial directions so that these gases pass through the filter medium 314, through the openings 208 of the circumferential wall 206, and through the apertures 156 to exit the inflator 220.

Beneficially, the baffle 316 may also keep the gases of the second gas flow pathways 326 from interfering with the operation of the first chamber 280. Hence, either of the first chamber 280 and the second chamber 282 may be deployed without deploying the other, and without interfering with deployment of the other.

The filter module 312 may be manufactured in any of a variety of ways, as disclosed in the discussion of the filter module 212. The filter module 312 may also provide the benefits of cost savings through reduced material and streamlined assembly. A variety of different structures and methods may be used to enhance retention of a baffle within a filter module and/or facilitate manufacture of the filter module, as will be shown and described in connection with FIGS. 4 and 5.

Figure 4:
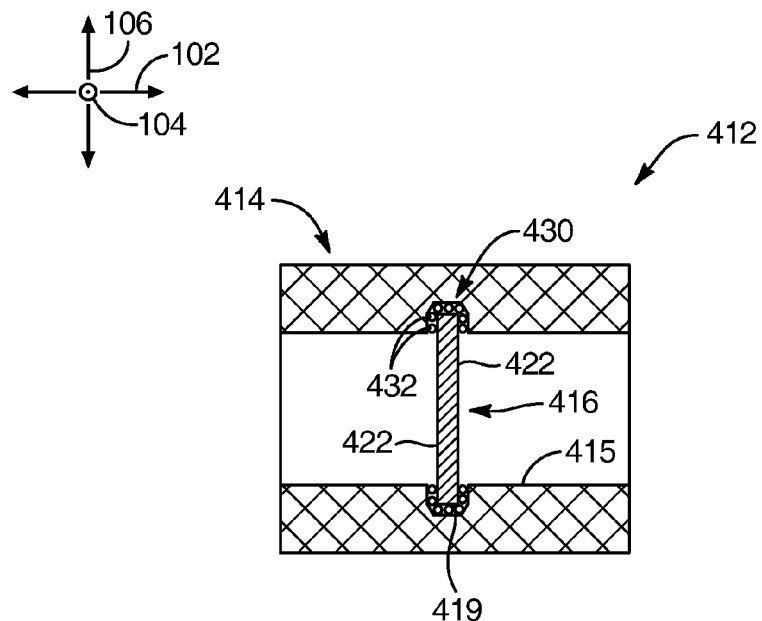
FIG. 4 is a side elevation, section view of a filter module of an inflator according to another alternative embodiment of the invention.

Referring to FIG. 4, a side elevation, section view illustrates a filter module 412 of an inflator according to another alternative embodiment of the invention. The filter module 412 may have a filter medium 414 with an interior surface 415 defining an interior cavity within the filter medium 414. The filter module 412 may also have a baffle 416 that resides entirely within the interior cavity defined by the interior surface 415. The baffle 416 may be similar to the baffle 316 of the previous embodiment, and may this have a generally discoid shape with a circumferential region 419 captured by the interior surface 415 of the filter medium 414, and two impingement surfaces 422 that face in opposite longitudinal directions.

The filter module 412 may differ from the filter module 312 of the previous embodiment in that the filter module 412 has a support structure 430 different from the material of which the main body of the filter medium 414 is formed. The support structure 430 may provide enhanced support for the baffle 416 to ensure that the circumferential region 419 of the baffle 416 remains retained by the interior surface 415. As shown, the support structure 430 may have one or more support wires 432. If the filter medium 414 is formed of metal wire, such as woven or compacted wire, the support wires 432 may be larger in diameter than the wires of which the body of the filter medium 414 is made.

Thus, the support wires 432 may have higher rigidity than that of the surrounding material. The support wires 432 may provide enhanced resistance to any tendency of the circumferential region 419 of the baffle 416 to shear away the abutting portion of the filter medium 414 as gases impinging against either of the impingement surfaces 422 exert force on the baffle 416 tending to move it in the longitudinal direction 102.

The support wires 432 may be wound in a semi-toroidal shape to form the support structure 430. Alternatively, the support wires 432 may be woven or otherwise grouped into the desired shape. If desired, the support wires 432 may be welded, bonded, or otherwise secured together to enhance their ability to retain the baffle 416 in spite of the action of the forces described above.

The filter module 412 may be made in a variety of ways. In one example, the support structure 430 may be provided first, and then the filter medium 414 may be formed around the support structure 430. The baffle 416 may then be inserted into the support structure 430, for example, by temporarily deflecting the support wires 432 to enable the support structure 430 to receive the baffle 416, and then deflecting the support wires 432 back into position. Alternatively, the support structure 430 may be inserted into engagement with the interior surface 415 of an existing filter medium 414. The baffle 416 may optionally be inserted into the support structure 430 prior to assembly of the support structure 430 and the filter medium 414.

According to one embodiment, the support structure 430 may be wound into place around the circumferential region 419 of the baffle 416. Then, the filter medium 414 may be formed around the support structure 430 and the baffle 416. Any of these methods may be used in combination with any of the methods set forth in the description of manufacture of the filter module 212 and/or in combination with other manufacturing methods known in the art.

Figure 5:
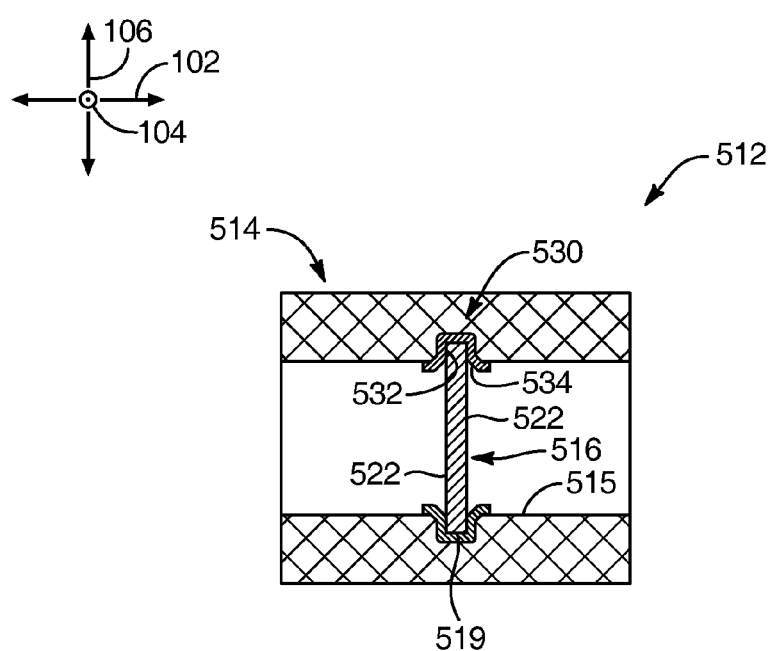
FIG. 5 is a side elevation, section view of a filter module of an inflator according to yet another alternative embodiment of the invention.
Figure 6:
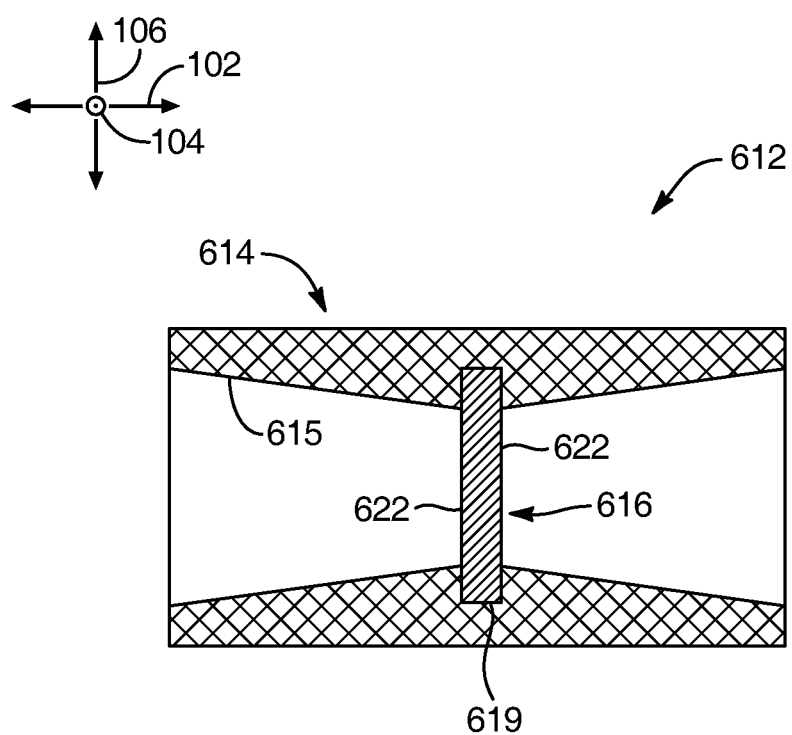
FIG. 6 is a side elevation, section view of a filter module of an inflator according to still another alternative embodiment of the invention.

Referring to FIG. 5, a side elevation, section view illustrates a filter module 512 of an inflator according to yet another alternative embodiment of the invention. As shown, the filter module 512 may have a filter medium 514 with an interior surface 515 that defines an interior cavity within the filter medium 514. The filter module 512 may also have a baffle 516 with a discoid shape similar to that of the baffle 416 of the previous embodiment. The baffle 516 may have a circumferential region 519 captured by the interior surface 515 and impingement surfaces 522 that face in opposite directions.

The filter module 512 may also have a bracket 530 that penetrates the interior surface 515 and is seated in the interior of the filter medium 514 to help retain the baffle 516. Like the support structure 430 of the previous embodiment, the bracket 530 may help to keep the baffle 516 in place within the structure of the filter medium 514, which may be relatively more pliable. The bracket 530 may have a fitted region 532 that receives the circumferential region 519 relatively snugly, and a splayed region 534 that tapers outward toward the axis of the bracket 530 to facilitate entry of baffle 516 into engagement with the fitted region 532.

The filter module 512 may be manufactured in a wide variety of ways. According to one example, the baffle 516 may be provided first, and then the bracket 530 may be stamped, molded, or otherwise formed around the circumferential region 519 of the baffle 516. Then, the filter medium 514 may be formed around the bracket 530.

Alternatively, the baffle 516 may be inserted into the bracket 530 after the bracket 530 has been formed and/or seated in the interior cavity of the filter medium 514. Any of the methods set forth in the preceding description and/or any of a variety of known manufacturing methods may be combined to effectively manufacture the filter module 512 illustrated in Figure Referring to FIG. 6, a side elevation, section view illustrates a filter module 612 of an inflator according to still another alternative embodiment of the invention. As shown, the filter module 612 may have a filter medium 614 with an interior surface 615 that defines an interior cavity within the filter medium 614. The filter module 612 may also have a baffle 616 with a discoid shape similar to that of the baffle 416 and the baffle 516 of the previous embodiments. The baffle 616 may have a circumferential region 619 captured by the interior surface 615 and impingement surfaces 622 that face in opposite directions.

The filter module 612 may be different from previous embodiments in that the interior surface 615 has an hourglass-like shape. Thus, the interior surface 615 may taper such that, from both ends of the filter module 612, the interior surface 615 gets narrower as it approaches the baffle 616. The filter module 612 may also have a more elongated shape in the longitudinal direction 102 than those of previous embodiments.

The taper may serve to thicken the portion of the filter medium 614 that surrounds the baffle 616 to permit the baffle 616 to penetrate more deeply into the material of the filter medium 614. This may enhance retention of the baffle 616 by providing more support, in particular, to resist any tendency of the baffle 616 to shear through the capturing material of the filter medium 614 and move in the longitudinal direction 102.

The tapered shape of the interior surface 615 may also help induce the gas flows impinging against the impingement surfaces 622 to deposit additional impurities proximate the baffle 616. More precisely, as inflation gases approach the baffle 616, they may enter the more restrictive space proximate the baffle 616, wherein the interior surface 615 defines a narrower passageway. This may produce a flow restriction that induces the gas flows to reverse directions and travel toward the outer portions of the filter module 612, where the interior surface 615 defines a broader passageway. In the process of reversing directions, the inflation gases may deposit impurities on the impingement surface 622, thereby enhancing the purity of the inflation gases exiting the inflator (not shown).

Those of skill in the art will recognize that the filter module 212, the filter module 312, the filter module 412, the filter module 512, and the filter module 612 are only examples of how the present invention may be applied. A wide variety of filter modules may be made and used in conjunction with the various known inflator types and configurations.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 Para. 6. It will be apparent to those having skill in the art that changes may be made to the details of the above-described embodiments without departing from the underlying principles of the invention. Embodiments of the invention in which an exclusive property or privilege is claimed are defined as follows.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An inflator for an airbag assembly for protecting a vehicle occupant from injury, the inflator comprising:
   an exterior wall comprising an aperture;
   a first gas source contained within a first chamber defined within the exterior wall, wherein, in response to receipt by the inflator of a first activation signal, the first gas source provides a gas that defines a first gas flow pathway that moves through the inflator and exits the inflator via the aperture; and
   a filter module positioned in the first gas flow pathway, the filter module comprising:
   a filter medium having plurality of holes sized such that, as the gas flows through the filter medium, particulate matter entrained in the gas is trapped in the filter medium; and
   a baffle secured to the filter medium, the baffle comprising an impingement surface positioned such that the gas impinges against the impingement surface in a manner that causes redirection of the first gas flow pathway;
   wherein the baffle is positioned such that the baffle is in contact with no component of the inflator outside the filter module.

2. The inflator of claim 1, wherein the inflator further comprises a second gas source contained within a second chamber defined within the exterior wall, wherein, in response to receipt by the inflator of a second activation signal, the second gas source provides gas that defines a second gas flow pathway that moves through the inflator and exits the inflator via the aperture.

3. The inflator of claim 2, wherein the filter module is positioned in the second gas flow pathway, wherein the impingement surface is substantially planar and is oriented substantially perpendicular to the first gas flow pathway where the gas impinges against the impingement surface, wherein redirection of the first gas flow prevents the first gas flow from flowing directly into the second chamber through the filter module.

4. The inflator of claim 1, wherein the inflator further comprises a second gas source contained within a second chamber defined within the exterior wall, wherein, in response to entry of the first gas flow into the second chamber, the second gas source provides gas that defines a second gas flow pathway that moves through the inflator and exits the inflator via the aperture.

5. The inflator of claim 4, wherein the impingement surface defines a generally frusto-conical shape having an axis oriented substantially parallel to the first gas flow pathway where the gas impinges against the impingement surface, wherein redirection of the first gas flow directs the first gas flow into the second chamber to facilitate initiation of gas provision by the second gas source.

6. The inflator of claim 1, wherein the filter medium comprises a generally tubular shape comprising an interior surface that defines an interior cavity within which the baffle resides, wherein the baffle comprises a circumferential region captured directly by the interior surface.

7. The inflator of claim 1, wherein the filter medium comprises a generally tubular shape comprising an interior surface that defines an interior cavity within which the baffle resides, wherein the filter module further comprises a bracket captured by the interior surface, wherein the baffle comprises a circumferential region that abuts the bracket such that the bracket supports the baffle.

8. The inflator of claim 1, wherein the filter medium comprises a generally tubular shape comprising an interior surface that defines an interior cavity within which the baffle resides, wherein the filter medium is formed of a plurality of wires woven together, wherein the filter module comprises a support structure formed of a plurality of support wires that are significantly thicker than the plurality of wires of the filter medium, wherein the baffle comprises a circumferential region that abuts the support structure such that the support structure supports the baffle.

9. The inflator of claim 1, wherein the filter medium comprises a generally tubular shape comprising an interior surface that defines an interior cavity within which the baffle resides, the interior surface having ends on either side of the baffle, wherein the interior surface is tapered such that the filter medium is thicker where it surrounds the baffle than at the ends of the interior surface.

10. A method of manufacturing an inflator, the method comprising:
providing an exterior wall comprising an aperture;
providing a first gas source;
positioning the first gas source within a first chamber defined within the exterior wall such that, in response to receipt by the inflator of a first activation signal, the first gas source provides a gas that defines a first gas flow pathway that moves through the inflator and exits the inflator via the aperture;
providing a filter module comprising a filter medium having plurality of holes, and a baffle secured to the filter medium, the baffle comprising an impingement surface; and
positioning the filter module in the first gas flow pathway such that, as the gas flows through the filter medium, particulate matter entrained in the gas is trapped in the filter medium and the gas impinges against the impingement surface in a manner that causes redirection of the first gas flow pathway;
wherein providing the filter module comprises securing the baffle to the filter medium prior to positioning of the filter module in the first gas flow pathway.

11. The method of claim 10, further comprising:
providing a second gas source; and
positioning the second gas source within a second chamber defined within the exterior wall such that, in response to receipt by the inflator of a second activation signal, the second gas source provides gas that defines a second gas flow pathway that moves through the inflator and exits the inflator via the aperture.

12. The method of claim 11, wherein the impingement surface is substantially planar, wherein positioning the filter module in the first gas flow pathway comprises positioning the filter module in the second gas flow pathway and orienting the impingement surface substantially perpendicular to the first gas flow pathway where the gas impinges against the impingement surface, wherein redirection of the first gas flow prevents the first gas flow from flowing directly into the second chamber through the filter module.

13. The method of claim 10, further comprising:
providing a second gas source; and
positioning the second gas source within a second chamber defined within the exterior wall such that, in response to entry of the first gas flow into the second chamber, the second gas source provides gas that defines a second gas flow pathway that moves through the inflator and exits the inflator via the aperture.

14. The method of claim 13, wherein the impingement surface defines a generally frusto-conical shape, wherein positioning the filter module in the first gas flow pathway comprises orienting an axis of the frusto-conical shape substantially parallel to the first gas flow pathway where the gas impinges against the impingement surface, wherein redirection of the first gas flow directs the first gas flow into the second chamber to facilitate initiation of gas provision by the second gas source.

15. The method of claim 10, wherein the filter medium comprises a generally tubular shape comprising an interior surface that defines an interior cavity, wherein the baffle comprises a circumferential region, wherein securing the baffle to the filter medium comprises directly capturing the circumferential region with the interior surface.

16. The method of claim 10, wherein the filter medium comprises a generally tubular shape comprising an interior surface that defines an interior cavity, wherein the baffle comprises a circumferential region, wherein the filter module further comprises a bracket, wherein securing the baffle to the filter medium comprises:
capturing the bracket with the interior surface; and
positioning the baffle such that the circumferential region abuts the bracket such that the bracket supports the baffle.

17. The method of claim 10, wherein the filter medium comprises a generally tubular shape comprising an interior surface that defines an interior cavity, wherein the filter medium is formed of a plurality of wires woven together, wherein the filter module comprises a support structure formed of a plurality of support wires that are significantly thicker than the plurality of wires of the filter medium, wherein the baffle comprises a circumferential region, wherein securing the baffle to the filter medium comprises:

capturing the support structure with the interior surface; and positioning the baffle such that the circumferential region abuts the support structure such that the support structure supports the baffle.

18. An inflator for an airbag assembly for protecting a vehicle occupant from injury, the inflator comprising:
   an exterior wall comprising an aperture;
   a first gas source contained within a first chamber defined within the exterior wall, wherein, in response to receipt by the inflator of a first activation signal, the first gas source provides a gas that defines a first gas flow pathway that moves through the inflator and exits the inflator via the aperture;
   a second gas source contained within a second chamber defined within the exterior wall; and
   a filter module positioned in the first gas flow pathway, the filter module comprising:
   a filter medium having plurality of holes sized such that, as the gas flows through the filter medium, particulate matter entrained in the gas is trapped in the filter medium; and
   a baffle secured to the filter medium, the baffle comprising an impingement surface positioned such that the gas impinges against the impingement surface in a manner that causes redirection of the first gas flow pathway;
   wherein the filter medium comprises a generally tubular shape comprising an interior surface that defines an interior cavity within which the baffle entirely resides.

19. The inflator of claim 18, wherein, in response to receipt by the inflator of a second activation signal, the second gas source provides gas that defines a second gas flow pathway that moves through the inflator and exits the inflator via the aperture, wherein the filter module is positioned in the second gas flow pathway, wherein the impingement surface is substantially planar and is oriented substantially perpendicular to the first gas flow pathway where the gas impinges against the impingement surface, wherein redirection of the first gas flow prevents the first gas flow from flowing directly into the second chamber through the filter module.

20. The inflator of claim 18, wherein, in response to entry of the first gas flow into the second chamber, the second gas source provides gas that defines a second gas flow pathway that moves through the inflator and exits the inflator via the aperture, wherein the impingement surface defines a generally frusto-conical shape having an axis oriented substantially parallel to the first gas flow pathway where the gas impinges against the impingement surface, wherein redirection of the first gas flow directs the first gas flow into the second chamber to facilitate initiation of gas provision by the second gas source.

* * * * *